(12) United States Patent
Rieth et al.

(10) Patent No.: US 8,024,089 B2
(45) Date of Patent: Sep. 20, 2011

(54) DEVICE FOR A CHILD SEAT

(75) Inventors: Peter Rieth, Eltville (DE); Jürgen Diebold, Eschborn (DE); Georg Halasy-Wimmer, Vaihingen (DE); Maxim Arbitmann, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1132 days.

(21) Appl. No.: 11/568,190

(22) PCT Filed: Apr. 22, 2005

(86) PCT No.: PCT/EP2005/051818
§ 371 (c)(1),
(2), (4) Date: Jun. 14, 2007

(87) PCT Pub. No.: WO2005/102771
PCT Pub. Date: Nov. 3, 2005

(65) Prior Publication Data
US 2007/0294013 A1 Dec. 20, 2007

(30) Foreign Application Priority Data
Apr. 23, 2004 (DE) .......................... 10 2004 020 402

(51) Int. Cl.
*B60N 2/26* (2006.01)
(52) U.S. Cl. ......................................... 701/45; 340/436
(58) Field of Classification Search .................... 701/45; 340/436, 667; 280/735; 180/268, 273
See application file for complete search history.

(56) References Cited

U.S. PATENT DOCUMENTS

| 4,732,409 A * | 3/1988 | Colasanti ...................... 280/808 |
| 5,552,986 A | 9/1996 | Omura et al. |
| 6,604,597 B2 * | 8/2003 | Fujii et al. ...................... 180/268 |
| 6,623,074 B2 * | 9/2003 | Asbach et al. ............. 297/250.1 |
| 2002/0188393 A1 | 12/2002 | Yokota et al. |

FOREIGN PATENT DOCUMENTS

| DE | 3635644 | 4/1987 |
| DE | 4410402 | 9/1994 |
| DE | 19855032 | 8/2000 |
| DE | 10216070 | 4/2003 |
| DE | 4243826 | 6/2004 |
| EP | 0603733 | 6/1994 |
| JP | 11321496 | 11/1999 |

* cited by examiner

*Primary Examiner* — Dalena Tran

(57) ABSTRACT

Disclosed is a device for a child seat in a vehicle including a switch-over between comfort and safety mode of the child seat, depending on information suitable to predict an accident.

20 Claims, 2 Drawing Sheets

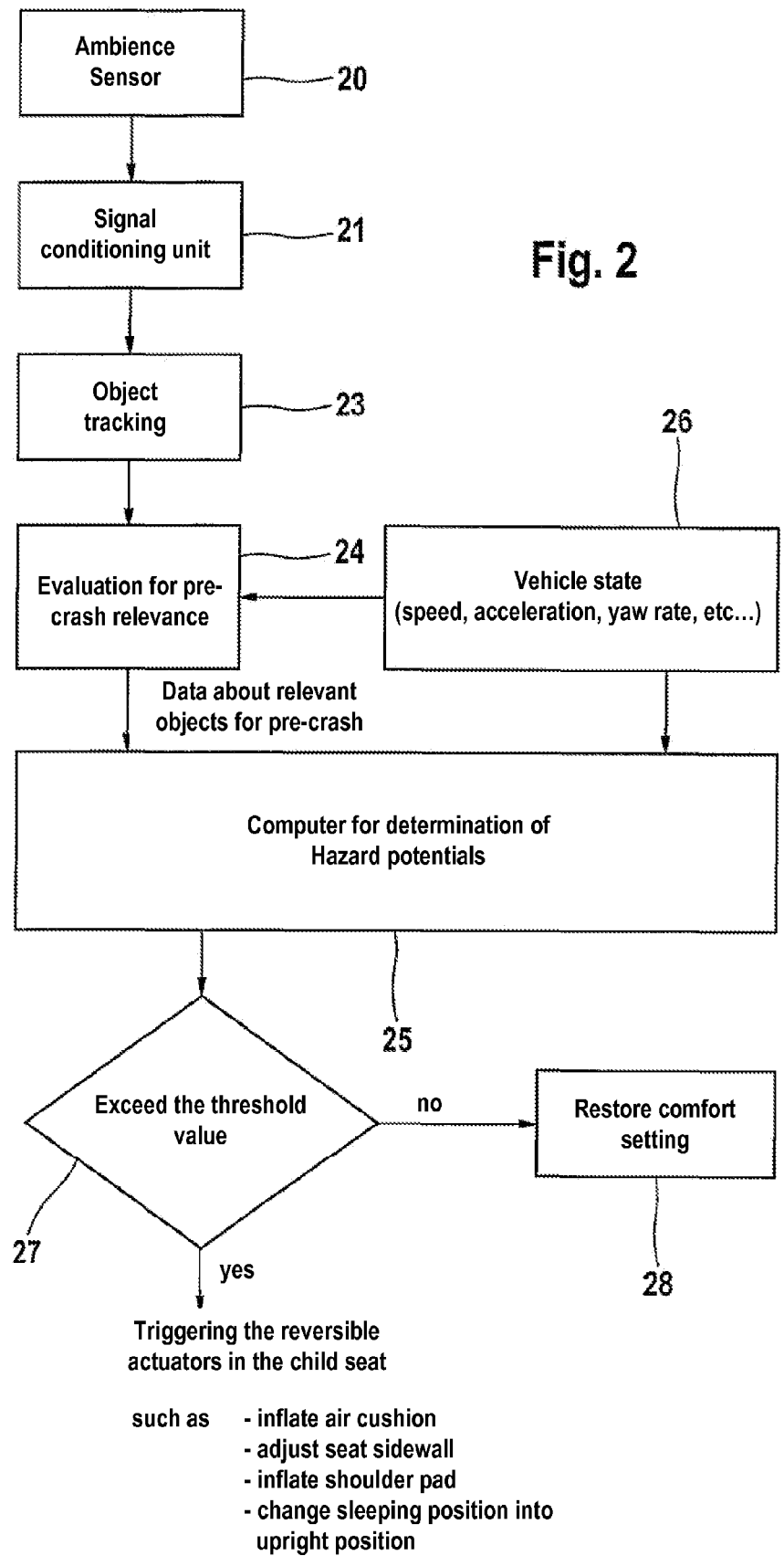

DEVICE FOR A CHILD SEAT

BACKGROUND OF THE INVENTION

The present invention relates to a device for a child seat, and a child seat as well as a vehicle including a device for a child seat.

So-called ISO-Fix retaining systems are used at an increasing rate to attach child seats in vehicles. To this end, the ISO-FIX child seat is equipped with two gripper arms, which are engaged in mating counterparts in the vehicle. This provides an absolutely tight connection between the child seat and the vehicle. Consequently, the braking deceleration of the vehicle is passed on directly to the child seat in an accident. The risks of misuse could be reduced considerably by ISO-FIX. In addition to the two gripper arms, the child seats are fixed by an additional belt (the Top Tether). DE 102 16 070 C1 describes a child seat equipped with an ISO-Fix attachment system.

A great number of documents deal with the detection of child seats, when these are mounted on the seat of a vehicle. Sensors are used for this purpose, which react to the attachment of the child seat to the seat. Co-driver airbags are deactivated in response to the sensor signal in order to avoid injuries of the child (EP 0 603 733 A1, DE 44 10 402 A1).

DE 36 35 644 A1 describes a seat occupancy device, which uses a passenger detector to detect whether the seat is occupied.

Comfort devices of the vehicle are actuated automatically in response to the sensor signal of the passenger detector.

Child seats for motor vehicles include already many features to improve the passive safety of babies and children when an accident occurs. Among these are shoulder cushions to protect the neck and head area, 5-point belt systems, passive absorbers in the headrest and the sidewalls, partly even with air cushions, which have to be adapted to the ergonomics of the child being protected before starting to drive.

All these passive protective measures have optimal effects only if they are actually adapted to the child before starting to drive.

The shortcoming of these passive protective measures involves that in general they limit the freedom of motion of children to a great degree and, thus, render driving at ease without 'protest' from the back seat only possible if the existing passive protective measures are not utilized in full.

An object of the invention is to provide a child seat, which allows the child to be comfortably seated, on the one hand, and safeguards optimal protection of the child in a case of danger, on the other hand.

DE 198 55 032 A1, admittedly, provides an acceleration sensor for a child seat, which is allocated to a seat-belt retractor for a helmet. However, this special system restricts the possible movements for the child during travel even more.

SUMMARY OF THE INVENTION

According to the invention, this object is achieved in that a device for a child seat in a vehicle is equipped with a means of switch-over between comfort and safety mode of the child seat, depending on information suitable to predict an accident.

The device of the active child seat according to the invention can mainly comprise the following elements:
Active headrest sidewalls;
Active shoulder rests;
Active catching table;
Active safety belts of the child seat itself.

Each desired and suitable combination of the elements cited above is allowed.

The elements of the device of the child seat are preferably actuated by means of electromechanical Smart actuators.

One advantage of the invention resides in that these elements, when deactivated, remain in a neutral rest position and allow the child to ride in the vehicle in a safe and nevertheless comfortable manner, while offering a correspondingly large freedom of motion that satisfies a child's needs.

Favorably, the child seat includes a data interface and a current supply system to activate the elements. Preferably, the data interface and the current supply system are part of the attachment device of the child seat. The seat suitably has an ISO-FIX standard attachment system so that it is designed as a current supply system and data interface. The current and data connection is appropriately linked to the vehicle interior bus system so that the comfort and safety functions are connected to the communication network of the vehicle. All information of the vehicle is available to the comfort and safety function of the child seat via the bus system.

Advantageously, the switch-over between comfort and safety mode of the child seat, depending on information about an expected collision (pre-crash information) being found out prior to a collision, allow comfortable traveling, on the one hand, and optimal accident protection, on the other hand. The invention prevents conventional operating errors and safeguards the correct seat position or posture of the child in a pre-crash situation. Active setting/readjustment of the restraint systems such as headrests, sidewalls, safety belt or other catch systems allows e.g. lifting the head of a sleeping child by means of activated headrest sidewalls to adopt a more favorable, upright position, while shoulder rests are activated and the safety belts are tightened in addition.

Outside a danger situation, reasonable freedom of motion of the child shall be maintained in order to ensure comfort of travel.

Information provided in the vehicle is logically combined and evaluated in such a manner that a danger potential can be detected, which indicates the likelihood of collision, thus triggering the non-reversible or reversible restraint systems. The danger potential is then determined from predetermined and current vehicle data and/or ambience data.

Favorably, the device includes to this end ambience and driving dynamics sensors or models for the continuous detection of near and/or remote objects and for the determination of driving-dynamics state variables as vehicle data. The detected and calculated data is constantly determined anew and continuously submitted to a danger computer. The hazard situation of the vehicle is evaluated in the danger computer, and controlling interventions that are graded or not graded according to the danger potential are output to control actuators of the child seat depending on this evaluation and further criteria or weightings.

The controlling interventions to control the actuators for e.g. inflatable air cushions, adjustable sidewalls or the adjustment of the position of the child seat are submitted to an actuator control, which is connected to the danger computer, with the actuator control releasing conditionally, releasing, or blocking the controlling interventions according to the result of evaluation of the danger computer.

In order to be able to take into account different response times of the actuators to detected danger situations, on the one hand, and to the general danger situation, on the other hand, it is preferred to detect general and special danger potentials for the child seat and to generate actuator-responsive controlling interventions depending on the danger potentials. General danger potentials evaluate the longitudinal-dynamics driving condition and/or the lateral-dynamics driving condition of the vehicle in consideration of the ambience. Suitably, controlling interventions are generated for the reversible sidewalls, air cushions in the seat pan, and/or air cushions in the safety belt, and/or in the sidewalls of the child seat, when the danger potential composed of several danger potentials has exceeded a threshold value, being produced in consideration of the time of activation for the actuators of the child seat.

The child can be positioned in the child seat and buckled up in a comfort-oriented mode. In a safety-critical situation, reversible passive protection measures are activated, which serve to reduce the risk of injury.

Systems, which analyze the riding performance of the own vehicle and/or the ambience using appropriate ambience sensor means such as radar sensors and/or lidar sensors and/or cameras and thus evaluate the current traffic situation, render it possible to assess the risk of an accident before a collision occurs. This information is used according to the invention in order to reversibly activate the protection measures, which have previously been purely passive ones, in conformity with the danger situation.

All of the measures described may also be taken as a prevention, or they can be taken depending on measured or calculated quantities, e.g. in the event of a great (braking) deceleration or in the case of emergency braking, or by way of a brake assist function.

The conditions for the activation of the safety functions of one or more child seats can also be detected favorably by observing the child (falling asleep, for example).

When there is an increased risk of an accident, e.g. when a likelihood of collision is detected, in the event of a short time until collision (time to collision=ttc), and/or at a high relative speed of the vehicle, the sidewalls are moved reversibly, e.g. electromotively, towards the child's head to be protected in a particularly favorable manner, in order to avoid that the head slips off laterally in an accident.

Any possibly existing air cushions in the sidewalls or the remaining seat pan can be inflated before an accident occurs and thus fix the child's body optimally and with little load in the child seat.

Inflation of air cushions in the safety belt already prior to the accident is furthermore advantageous to reduce the load on the chest, so that in a subsequent accident during the collision, the displacement of the child to the front is supported in a large-surface manner and, hence, with low force.

Embodiments of the invention are illustrated in the accompanying drawings and will be described in detail hereinbelow.

BRIEF DESCRIPTION OF THE DRAWINGS

In the drawings:
FIG. 2 shows a flow chart for switching over from the comfort-oriented mode of the restraint systems to the safety-oriented mode of the restraint systems.

DETAILED DESCRIPTION OF THE DRAWINGS

Figure 1:
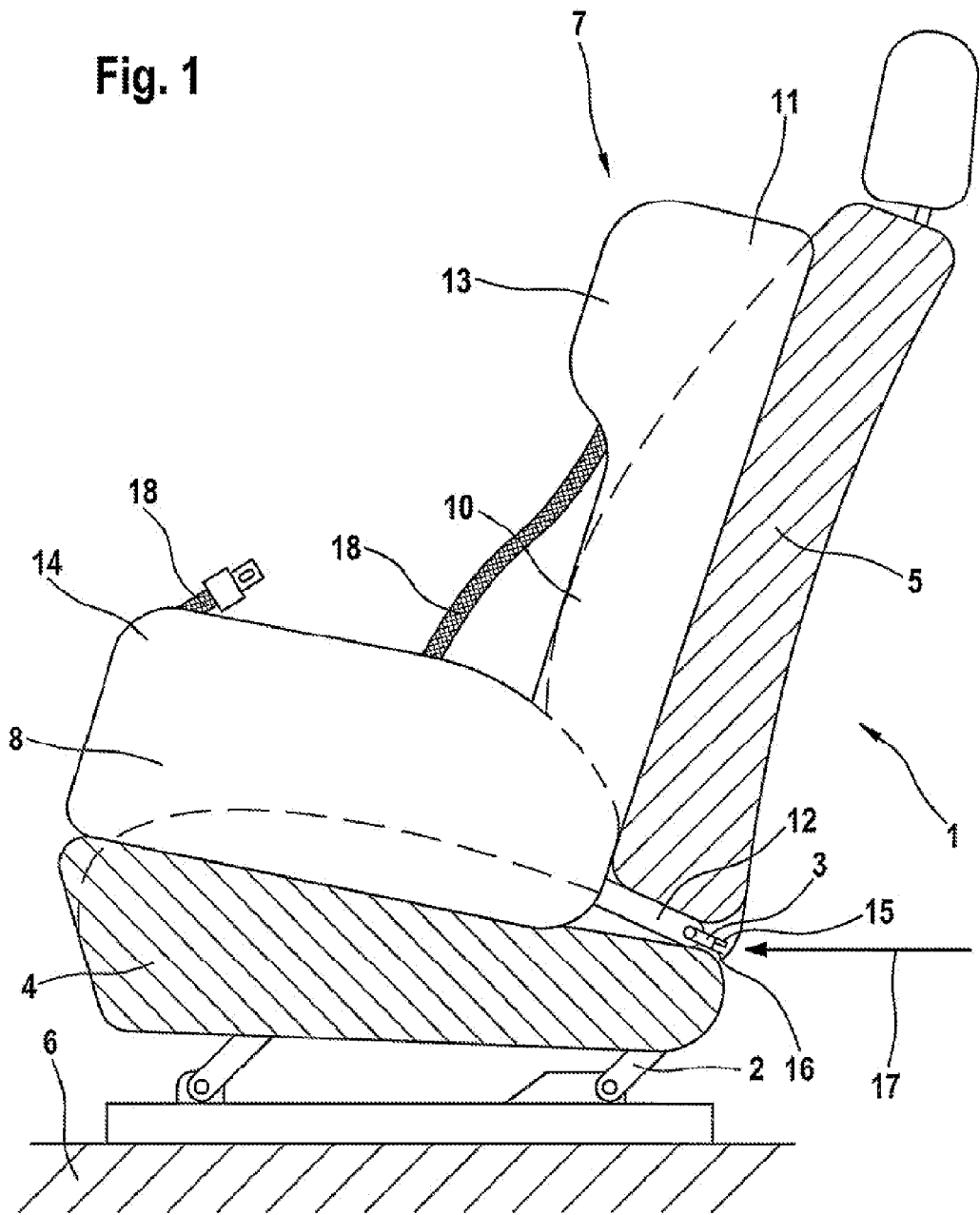
FIG. 1 is a schematic side view of a child seat equipped with an ISO-FIX attachment system.

A child seat 1 with seat frame 2 is attached to the vehicle body 6 according to FIG. 1. Two ISO-FIX brackets 3 are rigidly mounted on the seat frame. The vehicle seat 1 includes a seat cushion 4 and a backrest cushion 5 in a known fashion. The vehicle child seat 7 arranged on the vehicle seat 1 has a seat surface 8 and a backrest 10 with a headrest 11 provided in the upper area thereof. Seat surface 8, backrest 10, and headrest 11 have an integral design and form a seat pan. The headrest 11 and the seat surface 8 may include sidewalls 13, 14 for the head and the pelvis of the child, which are inflatable, or adjustable or deformable in other fashion. Further, lateral, inflatable supports (not shown) for the torso of the child may be provided, being adjacent to the backrest 10. A safety belt 18 (only shown schematically) of the child seat 7 is also furnished with elastic compartments which can change in their shape and are variable by means of a pressure source provided in the vehicle or directly at the seat. The child seat 7 is placed into the ISO-FIX brackets 3 by way of seat attachment struts 12 and is fastened or arrested herein.

At least one current supply unit 16 is provided in the ISO-FIX attachment system 12, 3.

Data can be transmitted using a bidirectional communication interface 15. Appropriate for this purpose are inexpensive Bluetooth or other radio-wave-based transmissions as well as direct connections.

Current supply unit 16 and data interface 15 can be separate plugs or can be integrated into the ISO-FIX attachment system. Means can be provided to determine pin assignment.

The current and data connection 15, 16 is suitably coupled to the vehicle interior bus system 17 so that the comfort and safety functions are connected to the vehicle communication network. The bus system is used to provide the comfort and safety functions of the child seat with any information of the vehicle and the vehicle with any information about the child seat. Thus, start of the vehicle can be prevented by way of the pin assignment in the event or improper connection of the child seat.

In a design variant, the activation of the safety functions in one child seat or in several child seats is triggered by way of an autonomous separated unit which can be retrofitted in the vehicle or child seat (e.g. 'pre-crash computer').

In this arrangement, it is provided according to another favorable design variant that the child seat is autonomous in terms of the activation of the safety functions and/or the energy supply. To this end, the child seat is equipped with a device for switching over between a comfort and safety mode. Data being appropriate to predict an accident can be made available to the device using wireless radio transmission. In this context, data refers to any vehicle information from the own vehicle and/or any other vehicle participating in traffic, and/or to GPS data. The child seat being equipped in this manner can be connected to other child seats of the same vehicle having only an actuator control and actuators.

According to a design variant, the activation of the safety functions in one or more child seats is triggered using a vehicle-inherent central unit, for example, the danger computer that will be described in the following.

FIG. 2 shows a flow chart for switching over from the comfort-oriented mode of the restraint systems to the safety-oriented mode of the restraint systems. The sequence shown allows triggering all restraint systems provided at the child seat 7, especially electrically adjustable and/or inflatable sidewalls, inflatable seat pans, and/or safety belts.

Logical branches are illustrated as lozenges in the flow chart.

Based on a given, defined situation, the ambience sensor means 20 determines ambience data such as the distance from the object, the relative speed to the object, relative acceleration to the object, status object valid, status type object, in the close range and/or distant range of the vehicle. Data of the ambience sensor means is read into the signal conditioning unit 21. The signals are subsequently conditioned so that they are available in the respectively correct unit. The tracking and a sensor fusion between close-range and distant-range sensor signals takes place in the object-tracking unit 23 so that the following modules will only use the merged sensor signal as distance, speed and acceleration signal. There is a uniformly consistent picture of the environment. This merged signal consequently represents the object list (distance, type, relative speed, and the like). The collision relevance of the objects is pre-detected by way of an object evaluation in block 24. Block 24 calculates the time until the collision (time to collision=ttc), the impact speed and acceleration, the impact angle, etc. The likelihood of an accident is investigated in the danger computer 25 connected to block 24 using the pre-detected, relevant objects. To this end, the danger computer is connected to a vehicle state detection unit. The driving conditions measured in the vehicle state detection 26 and/or determined in models are logically combined with the relevant collision objects and evaluated in the danger computer 25, and the likelihood of an accident is assessed by way of detected danger potentials.

The danger computer 25 mainly executes two process steps.

These process steps are:
1. calculation of danger potentials due to data of the object evaluation;
2. calculation of the actuating signals.

As this occurs, an abstract level is defined which evaluates the situation in a suitable manner. This level is realized by the danger potentials. The danger potential is a dimensionless quantity in the range of 0 to 100. The greater the danger potential is, the more dangerous the situation. The actuators are actuated only due to threshold value queries of the danger potentials. Several danger potentials can be combined in order to activate an actuator. This implies that the state assessment comprises the selection or the proportioning of actuation of the actuators such as sidewalls, reversible seat belt pre-tensioning systems, inflate seat cushion, etc., to an only limited extent in the beginning (see special danger potentials hereinbelow) or not at all (see general danger potentials hereinbelow). It becomes clear from the explanations that a defined situation is assessed by several danger potentials. This allows a more comprehensive assessment of the situation.

There are two different groups of danger potentials:
A: actuator-independent, general danger potentials
B: actuator-dependent, special danger potentials.

Thus, there is a danger potential, for example, which evaluates the longitudinal-dynamics driving condition. The evaluation of the longitudinal-dynamics driving situation is realized by way of a longitudinal-dynamics danger potential under the condition that the speed is higher than a minimum speed. This is achieved e.g. by a fuzzy-interference system. Fuzzy logic permits rendering human behavior or human knowledge of causalities mathematical and, thus, adapted to be imitated by computers. Subsequently, the traffic situation and the driving condition are classified with the aid of membership functions. The difference between nominal distance and actual distance relative to the nominal distance is evaluated as a first input quantity.

The nominal distance depends functionally on the own driving speed.

The relative speed as a second input quantity is also categorized by corresponding membership functions. The output quantity—hence the longitudinal-dynamics danger potential—is also categorized by means of membership functions.

The input quantities assessed in this manner are evaluated by means of logic operations simple to formulate,
'if . . . , then'
relations (rules) and will then result in a share in the entire danger potential for each individual rule, depending on the rate of execution. The resulting danger potential is achieved from the accumulation of the individual partial implications.

The longitudinal-dynamics danger potential, which depends on ambience sensor information, is determined as follows:

The assessment of the longitudinal-dynamics driving situation is realized by way of another longitudinal-dynamics danger potential. This danger potential is calculated as follows:
1. condition: the vehicle speed must exceed a threshold value (no danger potential is calculated when maneuvering)
2. condition: the relative speed to the detected object must be lower than a negative threshold.

This danger potential sets the deceleration, which is necessary to avoid a collision, in relation to a portion of the deceleration that can be transmitted maximally onto the road.

Accordingly, there is a general danger potential describing the lateral-dynamics driving condition. The lateral-dynamics danger potential is e.g. dependent on driving dynamics information of the ESP function.

This lateral-dynamics danger potential is zero as long as no ESP intervention takes place. If, however, ESP intervenes into driving dynamics, this danger potential is 100.

This definition is only a first embodiment. A finer graduation of this danger potential is achieved if the information about the additional yaw torque of the ESP related to a maximum at defined coefficient-of-friction conditions, which must be generated to stabilize the vehicle again, is used rather than the ESP on/off flag.

In contrast to these general danger potentials, there are special danger potentials tailored to defined actuators. These danger potentials take the fact into account that different actuators will also have different activation times and protection potentials. This means that the same situation is comparatively more critical for an actuator with a long activation time than it is for an actuator with a short activation time. It also implies that the same situation is comparatively more critical for an actuator with a high protection potential than for an actuator with a low protection potential.

The actuator-dependent, special danger potential for the actuation of e.g. the reversible belt pre-tensioning system of the child seat depends on the ambience sensor information.

This danger potential is calculated as follows:
1. condition: the vehicle speed must exceed a threshold value (no danger potential is calculated when maneuvering
2. condition: the relative speed to the detected object must be negative.

The actual calculation of the danger potential produces the quotient of the currently determined time to collision (ttc) from the sensor information and the average activation time of the reversible seat belt pre-tensioning system, the adjustable sidewalls of the child seat, the inflatable seat pan, and the like.

This quotient indicates how much time there is still left to fully activate the actuator on an average.

To enhance comfort, it can be arranged as an extension of this relation that the danger potential calculated hereinabove is limited to a defined value depending on the quotient of necessary deceleration and the maximum deceleration that can be transmitted onto the road. This assesses the possibility of the driver to brake before the accident still, hence to vary the condition variables speed and acceleration. These constant condition variables are demanded in the calculation of the time until the collision, as used hereinabove.

Lozenge 17 of the Figure characterizes the decision. If the danger potentials exceed the predetermined threshold values, controlling interventions for the child seat are released.

If the danger situation is over, the comfort mode set in 28 at the onset of travel is reset, and the child can continue traveling at ease.

The invention claimed is:

1. A device for a child seat in a vehicle, the device comprising:
   a switch-over between comfort and safety mode of the child seat, wherein the mode is selected depending on information suitable to predict an accident;
   wherein controlling interventions are generated for elements of the child seat, wherein the elements of the child seat include at least one of reversible sidewalls, air cushions in a seat pan, air cushions in a safety belt, and air cushion in the sidewalls of the child seat, when a composite danger potential composed of several danger potentials has exceeded a threshold value, being produced in consideration of the time of activation for the actuators of the child seat.

2. A device according to claim 1, wherein the switch-over between comfort and safety mode occurs depending on at least one of determined danger potentials from predetermined and current vehicle data or ambience data.

3. A device according to claim 2, wherein there are ambience sensors provided at the vehicle, which continuously detect objects, by driving-dynamics sensors or models which determine driving-dynamics state variables as vehicle data and continuously submit the determined data to a danger computer, with the danger computer making an assessment of the danger situation of the vehicle and, depending on the assessment and additional criteria or weightings, outputs controlling interventions for controlling the actuators of the child seat, which are graded or not graded according to the danger potential.

4. A device according to claim 3, wherein the controlling interventions to control the actuators are submitted to an actuator control, which is connected to the danger computer, with the actuator control releasing conditionally, releasing, or blocking the controlling interventions according to the result of evaluation of the danger computer.

5. A device according to claim 3, wherein general and special danger potentials for the child seat are detected and actuator-responsive controlling interventions are generated depending on the danger potentials.

6. A device according to claim 1, wherein general danger potentials evaluate the longitudinal-dynamics driving condition or the lateral-dynamics driving condition.

7. A device according to claim 1, wherein the child seat includes a data interface and a current supply unit.

8. A device according to claim 1, wherein the child seat includes an ISO-FIX standard attachment system, which is designed as a current supply unit.

9. A device according to claim 1, wherein the child seat includes an ISO-FIX standard attachment system designed as a data interface.

10. A device according to claim 9, wherein the data interface is designed as a wireless radio transmission.

11. A device according to claim 1, wherein the current and data connection is linked to the vehicle interior bus system.

12. A device according to claim 1, wherein actuation of the safety mode of the child seat occurs depending on an observation system for the child.

13. The device for a child seat in a vehicle of claim 1, wherein the child seat is adapted to be connected to an additional child seat via an interface, with actuators of the additional child seat are drivable by the device of the child seat.

14. A child seat for use in a motor vehicle, the child seat comprising:
   a device having a switch-over between comfort and safety mode of the child seat, wherein the mode is selected depending on information suitable to predict an accident;
   wherein controlling interventions are generated for elements of the child seat, wherein the elements of the child seat include at least one of reversible sidewalls, air cushions in a seat pan, air cushions in a safety belt, and air cushion in the sidewalls of the child seat, when a composite danger potential composed of several danger potentials has exceeded a threshold value, being produced in consideration of the time of activation for the actuators of the child seat.

15. A child seat according to claim 14, further comprising a device for predicting that the motor vehicle will be in an accident.

16. A child seat according to claim 15, wherein the child seat is adapted to be connected to an additional child seat via an interface, with actuators of the additional child seat are drivable by the device of the child seat.

17. The child seat for use in a motor vehicle of claim 14, wherein general danger potentials evaluate the longitudinal-dynamics driving condition or the lateral-dynamics driving condition.

18. A vehicle having a child seat therein, wherein the child seat has a device having a switch-over between comfort and safety mode of the child seat, wherein the mode is selected depending on information suitable to predict an accident;
   wherein controlling interventions are generated for elements of the child seat, wherein the elements of the child seat include at least one of reversible sidewalls, air cushions in a seat pan, air cushions in a safety belt, and air cushion in the sidewalls of the child seat, when a composite danger potential composed of several danger potentials has exceeded a threshold value, being produced in consideration of the time of activation for the actuators of the child seat.

19. The vehicle having a child seat therein of claim 18, wherein general danger potentials evaluate the longitudinal-dynamics driving condition or the lateral-dynamics driving condition.

20. The vehicle having a child seat therein of claim 18, wherein the child seat is adapted to be connected to an additional child seat via an interface, with actuators of the additional child seat are drivable by the device of the child seat.

* * * * *